Nov. 30, 1965  L. E. ASHMAN ETAL  3,220,671
SOLAR BALLOON OR AEROSTAT
Filed Oct. 28, 1963  3 Sheets-Sheet 1
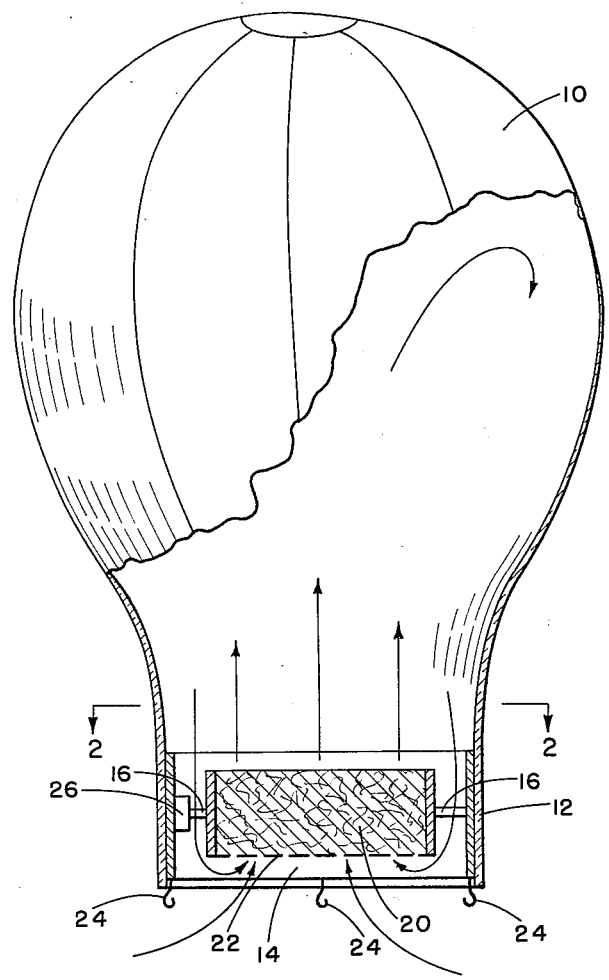
Fig. 1
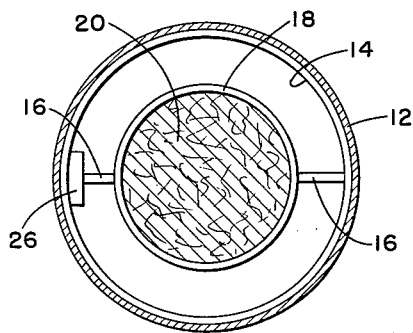
Fig. 2
Leland E. Ashman
Robert M. Jolkovski
*INVENTORS*
Agent Nov. 30, 1965   L. E. ASHMAN ETAL   3,220,671
SOLAR BALLOON OR AEROSTAT Filed Oct. 28, 1963   3 Sheets-Sheet 2

Leland E. Ashman
Robert M. Jolkovski
INVENTORS

BY
Agent

Nov. 30, 1965　　L. E. ASHMAN ETAL　　3,220,671
SOLAR BALLOON OR AEROSTAT
Filed Oct. 28, 1963　　　　　　　　　　　　　　3 Sheets-Sheet 3

Leland E. Ashman
Robert M. Jolkovski
INVENTORS

BY
Agent

3,220,671
SOLAR BALLOON OR AEROSTAT
Leland E. Ashman, Belmont, and Robert M. Jolkovski, Brighton, Mass., assignors to Arthur D. Little, Inc., Cambridge, Mass., a corporation of Massachusetts
Filed Oct. 28, 1963, Ser. No. 319,333
1 Claim. (Cl. 244—31)

This invention relates to solar-heated aerostats, i.e. to balloons and the like, of any size, heated by radiant energy from the sun, and thereby capable of both filling and rising due to the solar energy alone. These aerostats may be rounded or spherical, or cubic or angular, or of irregular shape. They may be large enough to carry instruments, e.g. for meteorological studies or aerial photography. On the other hand they may be in the form of toy balloons, including those of irregular shape such as of birds, fish, etc.

The concept of using solar energy to heat the air in a balloon, and thus provide lift, is not new. It has been described for example in Blondin's U.S. Patent 1,866,079, which provided a balloon bag coated on the outside with a heat-absorbing, weather-proofing, colored lacquer and on the inside with a heat-reflecting, impermeabilizing, white lacquer. In addition, extensive provisions were made for humidifying the air, and for directing the air flow within the balloon by means of baffles.

The drawbacks in such prior arrangements have included the use of heavy and opaque fabric, due to the outer and inner coatings, and the consequent inefficient transfer of the solar energy into the interior of the balloon through the coatings.

The present invention has as its principal objects the provision of a solar-heated aerostat or balloon of exceedingly simple construction, and very light weight; which may be made in a range of sizes from a child's toy to a carrier of meteorological instruments; and which may be inflated readily by convection of air due to solar heat alone, or if desired, with the aid of an air pump to start the inflation.

The balloon of this invention makes use of a thin plastic envelope that is transparent to solar radiation and which thus permits collection of the radiation by a medium located within the balloon. This medium is a blackened heat-absorbing agent in the form of very fine fibers arranged as a mat, blanket or other appropriate mass. In the case of small (e.g. toy) balloons the mat may be exceedingly thin, or even just a blackened inside surface opposite the transparent balloon face which is toward the solar radiation.

The thin transparent envelope of the balloon is made of a material such as "Mylar" polyethylene terephthalate), polyvinyl chloride, polyethylene, etc. which is capable of readily passing solar heat energy into the balloon interior. The envelope should be as thin as possible consistent with the strength required in the balloon. This seldom needs to be more than one mil (0.001 inch) in thickness; and for smaller sizes, and toy balloons, may be as thin as 0.1 to 0.2 mil.

The fibers of the mat or blanket are of mineral wool, preferably glass wool, and are preferably in the 1 to 3 micron diameter range, or even finer. Diameters larger than about 3 microns result in an excessively heavy mass of fibers. Best results are obtained with the finest fibers, as their heat-absorboing capacity, when blackened, is greater per any given weight of them, than that of thicker fibers. This is of course due to the greater surface area of the finer fibers, per unit weight. We have used fibers of less than ½ micron diameter, with excellent results but fibers of such small diameter are not at present readily available as bulk commodities.

The fibers are blackened in any suitable fashion which will provide an adequately adherent, very thin, coating. For example, they may be dusted with very fine carbon dust, which adheres well to glass fibers. Alternatively, the blackening may be effected by first coating the fibers with an oil and then degrading the oil to carbon, by means of heat treatment. Such carbon adheres very firmly to the fibers, with no tendency at all to dust off during handling of the balloon. When the carbon is applied by dusting on, there is a tendency for loss of some of the dust into the balloon interior on rough handling. This however may not be enough to be objectionable.

The fibrous mass must be sufficiently porous to allow free passage of air or gas through it. The air is heated by contact with the blackened fibers, which absorb heat energy from the solar radiation impinging on them. The combined effect of high porosity and very fine fibers is also necessary to permit penetration of solar radiation into a fairly thick mass or mat of fibers, which in the larger sizes of balloons may be as much as one to two inches thick. Although thicker mats may be used, they have a tendency to pack down and hence lose some of their effectiveness, as they thus tend to become opaque to passage of solar radiation into their lower layers. This packing tendency may be reduced by providing support means (e.g. coarse screens of very fine filaments) at one or more intermediate levels in the mat or blanket. In any event, to be most efficient the mat or blanket should not only be as porous as possible, but should also be thick enough to just shut off the passage through it of all sunlight, in other words the mat should permit the greatest possible amount of air within it, consistent with allowing no sunlight to pass completely through, and out of the bottom of, the mat.

In the small or toy balloons, however, the fibrous mat may be a mere fraction of an inch in thickness, or the blackening may be merely on the inside of the fabric opposite that at which the sun's rays enter, i.e., a mat of zero thickness but still presenting an opaque blackened aspect toward the rays.

The fibrous mat or mass may be supported by a foraminous sheet which permits the air to pass upwardly through it from the outside, as the mat becomes heated by solar radiation. This arrangement is preferred for larger types of balloons, and is required for any balloon which must be self-inflated. The foraminous sheet may be merely a coarse mesh weave of fine filaments; on the other hand it may be made of a reflecting surface which reflects back into the fibrous mass solar energy which has passed through the mass. When the sheet is made of a reflecting surface, it may also be arranged so that the mat and the surface may be turned over, thus exposing the reflecting surface to the sun, and stopping the heating effect, whereupon the air in the balloon will cool and the balloon will descend. The surface and mat may be turned over by automatic means, depending e.g. on time, or temperatures, or pressure within the balloon. Such means are well known and need not be described in detail here.

This invention will now be described in detail in connection with the accompanying drawings, which are intended to show typical examples of the many shapes and arrangements possible, but without limitation other than as embodied in the appended claim, and in which:

FIG. 1 is a side elevation, partly in section, of one embodiment of the aerostat of this invention;

FIG. 2 is a horizontal sectional view taken along line 2—2 of FIG. 1;

Figure 3:
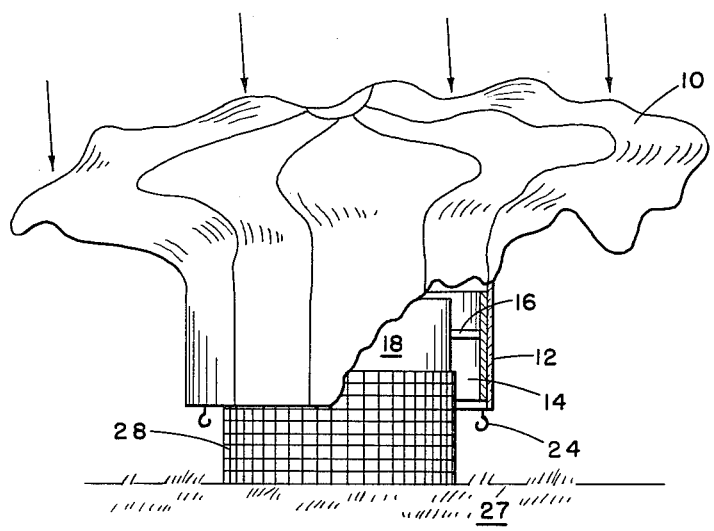
FIG. 3 is a side elevation, partly in section, of the areostat of FIG. 1, mounted off the ground on a foraminous support and in the early process of being inflated by the action of solar energy.

FIGS. 1–3 show balloon envelope 10, made e.g. of ¼ mil "Mylar," and of a diameter of say 3 feet, terminating at the bottom in an open neck 12, to which is attached a light weight rigid frame 14, which is provided with legs 16 supporting cylindrical element 18 in which is positioned blacked fibrous blanket 20 resting on foraminous support 22. Hooks or other fastening members 24 may be provided, attached to frame 14, for holding meteorological equipment, cameras, or other objects which it is desired that the balloon carry aloft.

Turning means 26 may be provided for turning the fibrous blanket assembly over, pivoted on legs 16, so that support 22 is uppermost. Means 26 may be a clockwork element which turns the blanket over at a predetermined time, or it may be an element responsive to a predetermined temperature or pressure within the balloon. The turning means 26 may of course be omitted if no turning is required.

Balloon 10 may be first partially inflated by blowing in air from the outside through the bottom of the structure. However, that is not necessary, and it may be completely inflated without such assistance. An arrangement for doing so is shown in FIG. 3, where the balloon is supported off the ground 27 by an open-mesh structure 28, which may be of woven wire, punched sheet metal, etc. Solar energy impinges on the collapsed bag 10 as shown by the arrows above the latter. The balloon lifts off of support 28 when sufficiently inflated.

The course of the air currents is shown by the arrows in FIG. 1. The sun's rays, striking from above through the balloon fabric 10, impinge on the blackened fiber blanket 20 and penetrate down into it, raising its temperature. The air in blanket 20 thereupon rises, and is replaced by air from the outside entering through structure 28 and support 22. Cooler displaced air in the balloon flows downwardly along the sides and out between frame 12 and cylindrical element 18, whence it is taken up along with outside air through blanket 20 and heated.

It is evident that a structure of the type shown in FIGS. 1–3 is self-regulating in that when it is filled to capacity, any further flow of air up through blanket 20 does not cause the balloon to burst; instead, excess air is exhausted out through the bottom of the balloon, between frame 12 and element 18.

Figure 4:
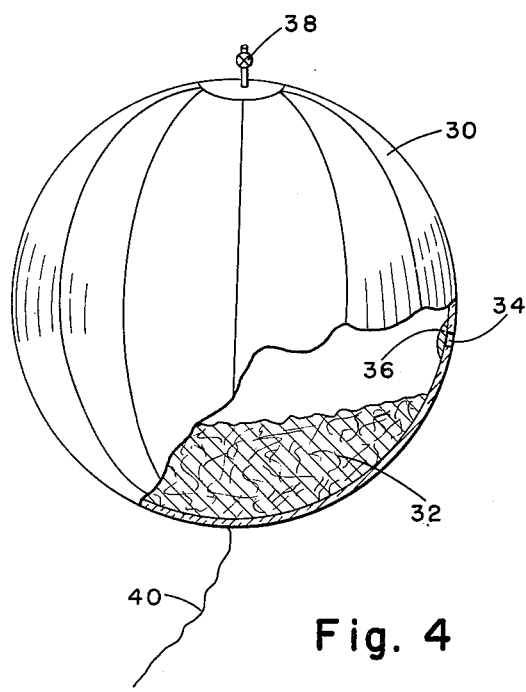
FIG. 4 is a side elevation, partly in section, of a closed form of aerostat, suitable for example as a toy balloon.

A closed form of balloon structure is shown in FIG. 4. This is a simpler type and may for example be used for toy balloons. The bag 30, which may be of any shape, although here shown as spherical, for simplicity, is made of thin transparent plastic, such as was described for bag 10, and is provided with a blackened fiber mat or mass 32 in the bottom. An opening 34 closed by a flap or other suitable closure 36 is provided so that the balloon may be inflated at least partially before exposing to the sun's rays. A relief valve 38 is also provided, to exhaust excess pressure, if it is desired that the balloon shall not explode. Alternatively, a single valve may of course serve the functions of both 24–36 and 38. A cord 40 may also be provided if it is desired to control the balloon from the ground, or to attach any object or instrument to it.

The sun's rays, impinging upon balloon 30 from above (in the figure) cause a temperature rise in the fibrous mass 32, which in turn heats the air in contact therewith. This air rises, setting up an air circulation within the balloon and causing all the air therein to become heated and hence to expand, and thus, in turn, causing the balloon to rise.

Figure 5:
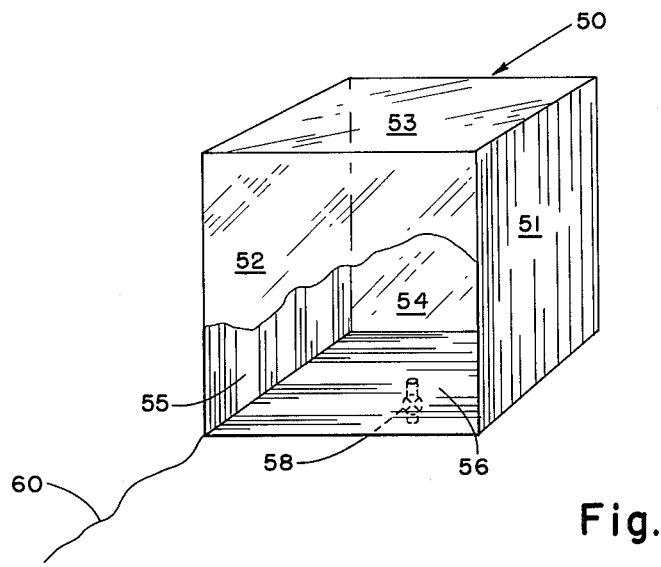
FIG. 5 is a view of another modification, in the form of a cube.

An angular arrangement is shown in FIG. 5, wherein balloon 50 is made up of sides 51, 52, 53, 54, 55 and 56, in the form of a cube. Element 58 may serve as a valve, through which the balloon may be inflated and which also may serve the same purpose as exhaust valve 38 of balloon 30 (FIG. 4). Element 58 may also be weighted to assist in maintaining the balloon in an "upright" position, i.e., so that the transparent sides face the sun. In balloon 50, instead of there being a mat of blackened fibers as in balloon 30, some of the sides are blackened on their inner faces. For example, sides 51, 55 and 56 may be blackened on their inner faces, leaving sides 52, 53, and 54 uncoated and transparent. The sun's rays striking through the transparent sides, heat the faces of the blackened sides, and consequently the adjacent air, which expands and circulates in the manner already described with respect to balloon 30. A cord 60 may be provided, serving the same purpose as cord 40 in FIG. 4.

Figure 6:
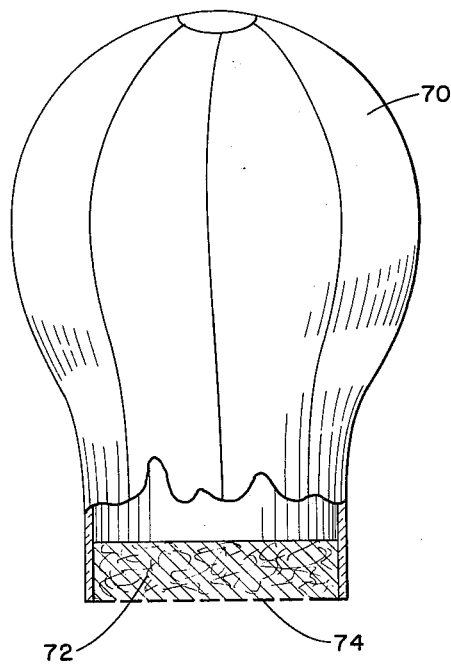
FIG. 6 is a side elevation, partly in section, of an aerostat of somewhat simpler construction than that of FIGS. 1–3.

A simpler form of the balloon of FIGS. 1–3, useful particularly for somewhat smaller sizes, is shown in FIG. 6. There the bottom opening of the transparent bag 70 is provided with a mat 72 of blackened fibers resting on a perforated or reticulate support 74 stretched across the bag mouth. Rays of the sun, passing through the walls of bag 70, heat mat 72 and the air within it, which rises, inflating the balloon and drawing air in from the outside. As in the case of the balloon of FIGS. 1–3, the pressure in the balloon 70 will not become excessive, as when the pressure tends to rise above that of the ambient air, the pressure equalizes by discharge of sufficient air out through mat 72.

It is evident that many other shapes and sizes of balloons of the general class herein described are possible. For example, toy balloons for children can be made in the shapes of animals, or can be multi-sided such as dodecahedra, icosahedra, etc. Appropriate lettering or decorations may be added, as long as they do not shut out any significant amount of solar radiation from entering the balloon. To this end it is, of course, better to have them on the lower side of the balloon, adjacent the blackening or the blackened mat, where they have no effect on the solar radiation entering the balloon and are more easily seen by people below. Also, in the case of smaller toy balloons used indoors, the radiation may be supplied by light bulbs instead of by the sun. Other modifications, within the scope of the appended claim, will occur to those skilled in this art.

We claim:

A balloon adapted to fill and rise by the effect of solar radiation alone, consisting essentially of:
(a) an envelope transparent to the rays of the sun,
(b) said envelope terminating at the bottom in an open throat,
(c) a mass of blackened fibers of less than 3 micron fiber diameter and readily permeable to air and the rays of the sun, positioned within said throat,
(d) said mass being spaced away from the sides of said throat, and pivotally mounted within said throat,
(e) a foraminous sheet supporting said mass, said sheet being a reflecting surface, and
(f) turning means associated with said mass, adapted to turn it over upon activation of said turning means by an appropriate signal, thereby shielding said mass from said rays.

References Cited by the Examiner

UNITED STATES PATENTS

| | | | |
|---|---|---|---|
| 1,866,079 | 7/1932 | Blondin | 244—31 |
| 2,268,320 | 12/1941 | Brandt | 126—270 |
| 2,506,755 | 5/1950 | Watson | 126—270 X |
| 2,998,005 | 8/1961 | Johnston | 126—270 |
| 3,110,457 | 11/1963 | Struble | 244—31 |
| 3,128,969 | 4/1964 | Yost | 244—31 |

MILTON BUCHLER, *Primary Examiner.*

FERGUS S. MIDDLETON, *Examiner.*